US012737180B1

(12) United States Patent
Sharma et al.

(10) Patent No.: US 12,737,180 B1
(45) Date of Patent: Sep. 15, 2026

(54) PERFORMING CONTEXT-SENSITIVE APPLICATION SUPPORT FOR SOFTWARE DEVELOPMENT USING ARTIFICIAL INTELLIGENCE

(71) Applicant: Morgan Stanley Services Group Inc., New York, NY (US)

(72) Inventors: Girish C. Sharma, Pennington, NJ (US); Biswaranjan Panigrahi, Bangalore (IN); Omaran Bazna, Dearborn, MI (US); Vivek Sharma, Ghaziabad (IN)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/248,315

(22) Filed: Jun. 24, 2025

(51) Int. Cl.
*G06F 8/71* (2018.01)
*G06F 8/10* (2018.01)
*G06F 16/901* (2019.01)
*G06F 16/953* (2019.01)

(52) U.S. Cl.
CPC .................. *G06F 8/71* (2013.01); *G06F 8/10* (2013.01); *G06F 16/9024* (2019.01); *G06F 16/953* (2019.01)

(58) Field of Classification Search
None
See application file for complete search history.

(56) References Cited

U.S. PATENT DOCUMENTS 11,928,569 B1 3/2024 Douthit
12,014,634 B1 6/2024 Nair et al.
12,061,970 B1 8/2024 Lo et al.
2012/0198351 A1* 8/2012 Lee .................... G06F 11/3688 715/744
2018/0329958 A1* 11/2018 Choudhury ......... G06F 16/2456
2019/0258575 A1* 8/2019 Dey .................... G06F 12/0862
2020/0272658 A1* 8/2020 . ............................ G06N 20/00
(Continued)

FOREIGN PATENT DOCUMENTS

WO 2025054413 A1 3/2025
WO 2025064877 A1 3/2025

OTHER PUBLICATIONS

"GitHub Copilot", Microsoft, Retrieved: Mar. 27, 2025, https://github.com/features/copilot, 12 pages.
(Continued)

*Primary Examiner* — Thu N Nguyen
(74) *Attorney, Agent, or Firm* — Duane Morris LLP

(57) ABSTRACT

A system or method performing context-sensitive application support for software development using artificial intelligence is disclosed. The system or method includes receiving a sequential, real-time input of browser events, which can include user input, audio or visual feeds, or network access events. Based on the input, an application type can be identified. A prompt configuring the behavior of a large language model (LLM) can be obtained based on the application type. The input and the prompt can then be sent to the LLM to produce an intermediate data object. That intermediate data object can then be compared to a configuration file, and a congruency of the intermediate data object can be produced. Output which is based on the congruency determination can then be output via a browser interface.

12 Claims, 8 Drawing Sheets

(56) References Cited

U.S. PATENT DOCUMENTS

| | | | | |
|---|---|---|---|---|
| 2021/0073661 | A1* | 3/2021 | Matlick | H04L 61/3025 |
| 2024/0111498 | A1 | 4/2024 | Vaughn | |
| 2024/0160902 | A1 | 5/2024 | Padgett et al. | |
| 2024/0202225 | A1* | 6/2024 | Siebel | G06N 20/00 |
| 2024/0202460 | A1 | 6/2024 | Schillace et al. | |
| 2024/0256948 | A1 | 8/2024 | Betthauser et al. | |
| 2024/0281621 | A1 | 8/2024 | Janakiraman et al. | |
| 2024/0403438 | A1* | 12/2024 | Chan | G06F 11/0793 |
| 2024/0419835 | A1* | 12/2024 | Karlberg | G06F 16/9024 |
| 2024/0427566 | A1 | 12/2024 | Lin et al. | |
| 2025/0068857 | A1 | 2/2025 | Lakshmikanthan et al. | |
| 2025/0200455 | A1 | 6/2025 | Naseem | |
| 2025/0259117 | A1* | 8/2025 | Moreno | G06Q 10/04 |
| 2025/0298825 | A1* | 9/2025 | Berg | G06F 30/323 |
| 2025/0355659 | A1 | 11/2025 | Cai et al. | |
| 2025/0365173 | A1* | 11/2025 | Volkov | H04N 7/155 |

OTHER PUBLICATIONS

“Zoom’s smart AI assistant that empowers you”, Zoom, Retrieved: Mar. 27, 2025, https://www.zoom.com/en/products/ai-assistant/, 7 pages.

Non-Final Office Action issued by the United States Patent and Trademark Office in U.S. Appl. No. 19/267,419, dated Feb. 10, 2026, 48 pages.

* cited by examiner

User 450
Web Site 455
Web Server Service 456
Site API 460
Load Balancer 464
Hosting Server 465A
Hosting Server 465B
Database 470A
Shard 471A
Shard 471B
Database 470B
Partition 471A
Partition 471B

```
# Get dependencies of site Web Site 455 or impacted services, jobs or
     databases if Web Site 455 is down
 MATCH (n:site_details {{site: " site "}})-
     [r:calls_service|site_connects_to_db|autosys_calls|autosys_connects_
     to_db]-(d)
WITH n, r, d
CALL apoc.create.setProperty(n, 'id', ID(n)) YIELD node as n_with_id
CALL apoc.create.setProperty(n_with_id, 'labels', labels(n_with_id))
     YIELD node as n_with_labels
CALL apoc.create.setProperty(d, 'id', ID(d)) YIELD node as d_with_id
CALL apoc.create.setProperty(d_with_id, 'labels', labels(d_with_id))
     YIELD node as d_with_labels
WITH collect(DISTINCT n_with_labels) as node, collect(DISTINCT r) as
     rels, collect(DISTINCT d_with_labels) as dependencies
RETURN node, dependencies, [nod in node | {{id: ID(nod), relations: [rel
     in rels | {{node_id: ID(startNode(rel)),
relation_name: type(rel), target_node_id: ID(endNode(rel))}}]}}] as
     relations
```

498

```
# Get all the servers where Web Site 455 is hosted
MATCH (n:site_details {{site: " Web Site 455 "}})-[r:lb_virtual]-
     >(l:lb_virtuals)-[p:pool_server]->(d:servers)
WITH n, r,l, p, d
CALL apoc.create.setProperty(n, 'id', ID(n)) YIELD node as n_with_id
CALL apoc.create.setProperty(n_with_id, 'labels', labels(n_with_id))
     YIELD node as n_with_labels
CALL apoc.create.setProperty(d, 'id', ID(d)) YIELD node as d_with_id
CALL apoc.create.setProperty(d_with_id, 'labels', labels(d_with_id))
     YIELD node as d_with_labels
CALL apoc.create.setProperty(l, 'id', ID(l)) YIELD node as l_with_id
CALL apoc.create.setProperty(l_with_id, 'labels', labels(l_with_id))
     YIELD node as l_with_labels
WITH collect(DISTINCT n_with_labels) as node, collect(DISTINCT
     d_with_labels) as dependencies, collect(DISTINCT r) as
     rels,collect(DISTINCT l_with_labels) as lbs, collect(DISTINCT p) as
     pools
RETURN node, dependencies, lbs as intermediate_dependencies,
[nod in node | {{id: nod.id, labels: nod.labels, relations: [rel in rels
     | {{node_id: nod.id, relation_name: type(rel), target_node_id:
     ID(endNode(rel))}}]}}] as l1_relation,
[lb in lbs | {{id: lb.id, labels: lb.labels, relations: [pool in pools |
     {{node_id: lb.id, relation_name: type(pool), target_node_id:
     ID(endNode(pool))}}]}}] as l2_relation
```

PERFORMING CONTEXT-SENSITIVE APPLICATION SUPPORT FOR SOFTWARE DEVELOPMENT USING ARTIFICIAL INTELLIGENCE

TECHNICAL FIELD

The present disclosure relates to performing context-sensitive application support using artificial intelligence (AI); and more particularly, to returning enhanced, context-sensitive application data streams for supporting software development operations in response to application input using AI.

BACKGROUND

Browsers are an increasingly popular mechanism for interfacing with complex software tools and business processes. As browsers have grown past being simple hypertext markup language (HTML) page rendering tools and have integrated multimedia functionality previously provided by external tools like the ADOBE FLASH software, browsers exploded in popularity over dedicated compiled software for use in interfacing with server or cloud-based applications. Browser extensions can extend browser capabilities by directly accessing browser events associated with a variety of webpages and corresponding web applications for which access permissions are granted. Browser extensions are not limited to the webpages actively viewed in the browser, but instead have access capabilities comparable to that of compiled software running on the operating system.

Generative Artificial Intelligence (Gen AI), and in particular large language models (LLMs), are based on generally powerful deep learning models and able to facilitate the transformation between imprecise, spoken-style language and machine-comprehensible data. These Gen AI tools can assist with the processing of browser events and interacting with web users.

Today's generally complex and lengthy software development life cycle (SDLC) can be largely managed in a web-based environment, generating a large number of related browser events. It would be helpful to have a system, such as a browser extension, which improves the SDLC across a large number of management tools utilizing Gen AI.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 4C illustrates example prompts aiding an LLM to produce the example graph of 4B, based on certain user input queries.

DETAILED DESCRIPTION OF CERTAIN EMBODIMENTS

Figure 1:
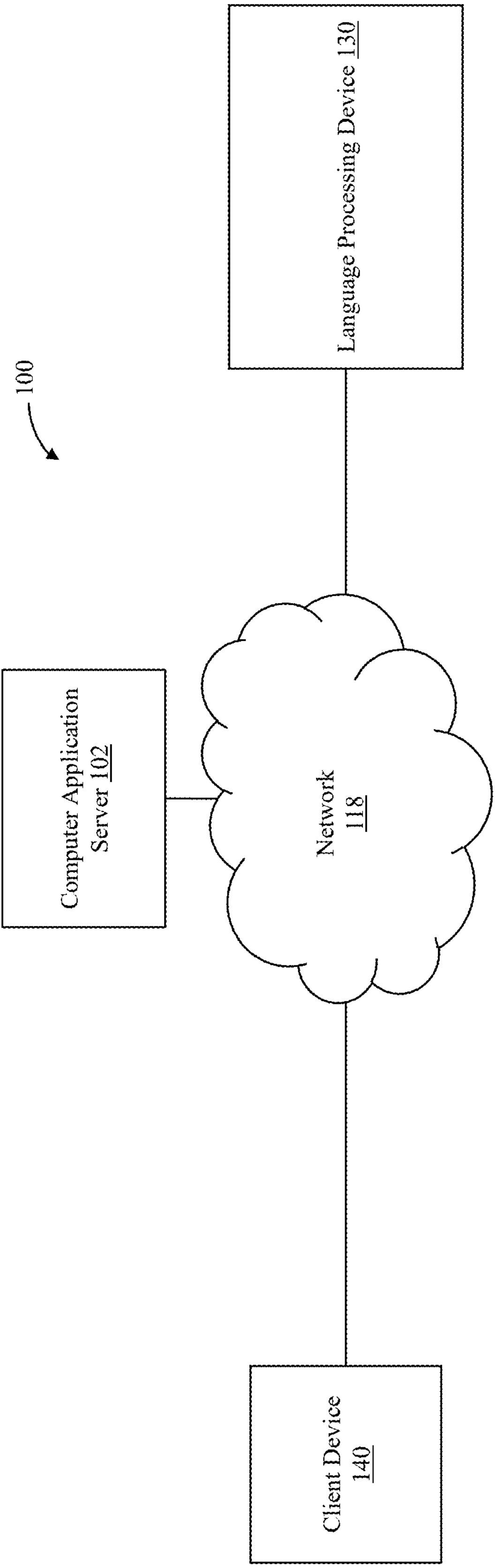
FIG. 1 illustrates an example networked system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices may be shown in block diagram form in order to avoid unnecessarily obscuring the example embodiment(s).

1. General Overview

A system or method performing context-sensitive application support for software development using artificial intelligence is disclosed. The system or method includes receiving a sequential, real-time input of browser events, which can include user input, audio or visual feeds, or network access events. Based on the input, an application type can be identified. A prompt configuring the behavior of an LLM can be obtained based on the application type. The input and the prompt can then be sent to the LLM to produce an intermediate data object. That intermediate data object can then be compared to a configuration file, and a congruency of the intermediate data object can be produced. Output which is based on the congruency determination can then be output via a browser interface.

The application type can include a source code review application type. Source code drawn directly from the browser window and a user query can be sent along with a configuration prompt tailored to the application context of the source code review application to the LLM. The LLM can then return analysis of the source code, including improvement recommendations or a decision regarding whether the source code achieves its assigned criteria, to the browser interface, and the improved code can be injected back into the source code file.

The application type can include a recorded meeting summarization application type. A recorded meeting, including one or more audio feeds captured directly from a browser, can be transcribed and sent to the LLM along with a configuration prompt tailored to the application context of the recorded meeting summarization application type. The LLM can then return a summary of the meeting, and instructions to project management software to create a project management ticket including acceptance criteria.

The browser interface receives the summary, and subsequently the project management ticket created by the project management software.

The application type can include an organization dependency graph application type. The organizational dependency graph application type can both produce dependency graphs, and traverse and display dependency graphs. A browser can record a sequence of one or more network access calls performed while the browser is used to perform a particular organizational or business task. Those network access calls can be associated with the organizational task, or a description of that organizational task, and then indexed and stored. Later, queries can be written regarding which organizational tasks are impacted by the availability of particular network access points, or which network access points are used by particular network access points, or whether certain users would be impacted by the unavailability of particular network access points or organizational tasks.

The system and method disclosed herein has several technical benefits. The disclosed systems and methods provide user context and application-specific assistance based on data gathered from different application contexts of applications related to software development. The systems and methods further facilitate coordination among the applications and leverage information related to individual applications to enrich the application context of other applications, resulting in emergent intelligence improvements in the software development life cycle. The systems and methods increase the efficiency and efficacy of software preparation, review, and troubleshooting by automatically suggesting source code improvements, managing code review and update processes, and enabling performance monitoring and diagnosis. These approaches result in more robust code which is easier to maintain, thereby reducing future overhead on the software development lifecycle. Specifically, the systems and methods increase the capacity for a meeting to produce actionable project management tickets, which can be collaboratively produced based on multi-party inputs during the meeting. The systems and methods produce a mapping of organizational processes to hardware and software interactions, data, and networks, and allow analysis regarding the impact upon organizational processes when changes are made or experienced by the hardware and software which supports the organization. The systems and methods expedite diagnosis of computer system errors and help reduce time to resolution.

2. Example Computing Environments

FIG. 1 illustrates a distributed computing environment 100 that includes a computer application server 102, a language processing device 130, and a client device 140 communicatively coupled over a network 118 using one or more wired and/or wireless connections. Each of the computer application server 102, the language processing device 130, and the client device 140 can be, for example, a server, a laptop, a desktop computer, a tablet computer, or any other suitable computing device programmed to carry out the corresponding functions described herein.

The network 118 can be implemented by any medium or mechanism that provides for the exchange of data between the various components of FIG. 1. Examples of the network 118 include, without limitation, one or more of a cellular network, a Wi-Fi network, a near-field communication (NFC) network, a Local Area Network (LAN), a Wide Area Network (WAN), any Internet capable network, or any other suitable wired or wireless communication network.

In some embodiments, the computer application server 102 is configured (i.e., programmed) to run one or more various computer applications instances. The application instances expose application programming interfaces (APIs) which are directly or indirectly accessible by API calls transmitted via the network 118. The application instances can include associated application databases or data sets, which can be accessed to return data, or have data modified by the API calls received via the network 118.

In certain embodiments, one or more computer application instances are instances of applications designed to support communication, business management, or software development. Applications designed to support software development can include applications for hosting virtual meetings, transcription applications, applications implementing a versioned source code repository, project management applications, or applications implementing a dynamic, real-time computer network status map.

In some embodiments, the computer application server 102 is configured to communicate with the language processing device 130 over the network 118. Alternatively, the language processing device 130 can be integrated into the computer application server 102.

In some embodiments, the client device 140 hosts and is configured to execute various computer applications, such as a browser, within which the client side of a web application can be running. The client device 140 can be configured to communicate with the computer application server 102 in automatically performing activities involving remote computer applications. The client device 140 can comprise a desktop computer, laptop computer, tablet computer, smartphone, or wearable device. In certain embodiments, at least a portion of the computer application server 102 can be integrated into the client device 140.

The language processing device 130 can be configured to receive human-readable, text-based prompts, and return human-readable outputs. In some embodiments, the language processing device 130 can be configured to return formatted API calls, which can be sent over the network 118 for execution at the computer application server 102 by one of the instantiated applications.

In some embodiments, the language processing device 130 is configured to perform Gen AI, and in further embodiments, the language processing device 130 is configured to train and execute an LLM. With respect to what prompts the language processing device 130 is capable of receiving and what outputs data the language processing device 130 is capable of returning, in some embodiments "human-readable" data can include written natural language or written language with customized although conventionally incorrect spelling, grammar, or syntax. For example, certain chatbots communicate using a specific language between one another, in order to efficiently convey programmatic information in a technically human-readable format. The language processing device 130 can communicate in a similar manner, and such communication would still quality as "human-readable".

The language processing device 130 can be programmed to receive queries or data from the client device 140, computer application server 102, or any instantiated applications, in a human-readable format or in a numerical or binary format, such as a vector embedding. The language processing device 130 can return output to the client device 140, computer application server 102, or any instantiated applications, in a human-readable format or in a numerical or binary format, such as a vector embedding.

In some embodiments, the language processing device 130, computer application server 102, or client device 140 directly or indirectly access and manage a repository for prior conversations with the client device 140. This repository can be queried to return cached results for repetitive queries from the client device 140 which would result in repetitive answers from the language processing device 130. Additionally, in some embodiments the language processing device 130, computer application server 102, or client device 140 can be programmed to generate or store augmenting or enhancing information for the queries, which can be used to provide additional prompt context or truths to the language processing device 130 as the language processing device 130 processes the user query. This additional prompt context can be provided via a retrieval-augmented generation (RAG) process, where the augmenting or enhancing information can be indexed for use by the language processing device 130. The augmenting or enhancing information can be the embedded within, or the custodial property of, the language processing device, the computer application server, or a third-party server (not shown.)

First, the indexed augmenting or enhancing information most relevant to the user query can be retrieved. The user query can then be re-structured to include the retrieved relevant augmenting or enhancing information. The re-structured user query is then provided to the language processing device 130. For example, the stored enhancing information can include pairings between internal organization acronyms likely referenced in the queries and their respective meanings: the language processing device 130, when operating as an external service, would generally not have the prompt context for the private meaning of words, phrases, or acronyms internal to the organization associated with the computer application server 102.

In some embodiments, the distributed computing environment 100 can include an automation orchestration device and a caching and query augmentation device, for processing and routing queries, prompts, and responses between the client device 140, computer application server 102, and the language processing device 130. Further details regarding the automation orchestration device, the caching and query augmentation device, as well as the distributed computing environment which includes and utilizes these devices may be found in U.S. patent application Ser. No. 19/093,177 titled "PROCESSING USER INPUT TO A COMPUTING ENVIRONMENT USING ARTIFICIAL INTELLIGENCE", the entire contents of which are incorporated by reference as if fully set forth herein.

3. Functional Descriptions

In some embodiments, the computer application server 102, the language processing device 130, and the client device 140 can each be programmed to perform specific functions, as discussed in various embodiments herein. These functions can be implemented as software components, general or special-purpose hardware components, firmware components, or any combination thereof.

In some embodiments, the client device 140, in conjunction with the computer application server 102, is configured to provide context-sensitive support to web applications providing data and services to the client device 140, such as web applications for the SDLC.

The client device 140 includes a browser. The browser can include a browser plug-in, or the webpage includes an embedded web widget. The browser plug-in or web widget constitute a web tool or browser extension. The browser extension has access to the active webpage of the browser, and presents a communication interface via the interface view. In some embodiments, the communication interface is represented as a chat window, which includes a field for text entry. The communication interface can also include a chat history display, including previous chat messages submitted and received via the communication interface. A user query can be received in the form of text or files into the browser extension. For example, the user query can include a string of text. Preferably, the input is contextually related to the webpage.

The client device 140 is configured to, via one or more browser extensions as described above, detect the current application context in the (web) browser, prepare input data for LLMs based on browser events associated with the current application context, obtain output data from the LLMs based on the input data, and provide context-sensitive support to user interaction with the relevant webpage and corresponding web application. The application context can be used to determine which LLM to use or what types of prompts are to be included in the input data, for instance. The application context can be specific to each web application or each type of web applications (such as conferencing, coding, project management), or it can be defined by other criteria related to applications.

In some embodiments, the computer application server 102 is configured to maintain a configuration file that specifies a list of possible application contexts related to the SDLC. For each application context, the configuration file can specify a list of web applications to which it has access permissions. For each web application, the configuration file can include various pieces of information, such as the name, website and relevant web addresses, or information regarding communication with one or more LLMs. The information regarding communication with one or more LLMs can include the types of browser events to collect, the LLMs to use, the prompt templates to use, how to compose input data for the LLMs, or how to process output data from the LLMs. The client device 140 is configured to access the configuration file and determine how to handle browser events and interact with the LLMs accordingly. The configuration file is used to select or prepare a configuration prompt. The configuration prompt is a Gen AI prompt or a portion of a Gen AI prompt, configured to ultimately be submitted to the language processing device 130. The configuration prompt can include instructions regarding how to process the user query in combination with the application context data.

In some embodiments, the client device 140, via one or more browser extensions, collects, organizes, analyzes, and stores browser events. The browser events can be front-end or backend events, and can include network traffic, such as GET or POST methods to or from the web application, or local memory access activity. The browser events can reference data, such as markup language element and their tags, attributes, and content, scripting instructions, and form inputs or modifications. The browser events can include resource modifications, including resource allocation modifications, made by the operating system or the hardware in the client device 140 upon which the browser operates. The browser events can include aggregate user inputs, such as blocks of typed text, as well as discrete user inputs, such as individual keystrokes, mouse movements, or screen taps. The browser events can also include listeners on computing or sensor resources for which the browser has access to, but is not utilizing for the purpose of page rendering or input submission, such as microphones or cameras, or readable remote application APIs. The browser events can be organized based upon the application context, and can be organized or grouped under the active webpage, or other webpages, for the purposes of this invention.

In some embodiments, the application context can be determined based on a configuration file, which can include one or more conditional factors which the browser compares to present environmental data. For example, application context can indicate that when the active webpage uniform resource locator (URL) includes "GITHUB", and the HTML code of the active webpage includes "div id="LC1"", then the active webpage includes at least a first line of code (LC1) and is displaying a GITHUB code file, and the context is editing a GITHUB file. That context can be used to implement application context-sensitive tools to assist the user in editing the GITHUB file. However, when the same webpage is open, but the browser extension is able to determine a virtual meeting is occurring (e.g., a Zoom meeting is occurring based on a Zoom application on the client device 140 broadcasting within the device a zoom meeting status) then the configuration file can inform the browser extension in determining that the application context is instead a meeting which may involve the GITHUB file. That alternative application context can be used to implement application context-sensitive tools to, for example, facilitate collaborative review of the GITHUB file.

In some embodiments, the computer application server 102 improves overall efficiency and productivity by utilizing a network effect across multiple client devices 140 and applications. For example, in a virtual meeting with multiple client devices 140, the computer application server 102 can utilize video and audio data from each client device 140 to improve speaker identification and speaker diarization. Additionally, the computer application server 102 can store queries, prompts, and responses from a particular client device 140 (e.g., a software developer client device) and utilize those queries, prompts, and responses in LLM operation with another client device 140 (e.g., a project manager client device). For example, when a software developer queries specific acceptance criteria, a project manager can be informed or updated that the relevant acceptance criteria are unclear. Alternatively, when a project manager submits queries regarding perceived errors in a code file produced by the developer, the computer application server 102 in concert with the LLM can respond that the developer also had queries and questions regarding the sections of the code file in which the project manager identified errors. These mutual queries can indicate unclear acceptance criteria, an area of unexpected difficulty, or additional areas of training required by developer. The project manager can also be updated generally on the progress of the software development, and can be briefed on in a conversational format whether, for example, the developer client device 140 is approaching compliance with the acceptance criteria.

In addition, at the application level, the computer application server 102 can utilize the data produced in one application context in another application, directly or through a project management system. As one example, a conferencing application text might indicate a bug in a source code file, which is then incorporated into a coding application context to fix the bug. As a further example, the coding application might require approval from multiple user accounts to check in specific code. The computer application server 102 can determine that all of these user accounts have provided approval from one or more conference summaries associated with the conferencing context and include an indication of those approvals in a prompt for an LLM to generate instructions for checking in specific code in the coding context.

3.1 Source Code Review

In some embodiments, for a coding application context, a browser extension can choose an LLM on the language processing device 130 trained to perform coding related tasks, such as one built into a collaborative coding platform. The browser extension combines source code content in the active webpage with a user query and a configuration prompt into a combined data object, and transmits that combined data object. The browser extension can transmit the combined data object directly to the language processing device 130, or the browser extension can transmit the combined data object to the computer application server 102.

In some embodiments, the user query can include any form of interactive data provided at the client device 140. The interactive data can be a typed query, or can include keystrokes, audiovisual data, or file streams. The interactive data can also include data from other applications, webpages, or browser extensions operating on the client device 140. Those other applications, webpages, or browser extensions may be actively manipulated by the user of the client device 140, or can be performing background processes which update the browser extension as they progress. For example, the user can highlight a first portion of code in a first browser tab, and then highlight a second portion of code in a second browser tab, and then click an interface button on the browser extension. The browser extension can check the browser tabs for highlighted portions of code, and transmit the text of the highlighted portions of the text to the LLM along with a configuration prompt instructing the LLM to prepare a summary comparison of the two portions of text. In another example, the user can modify a portion of text, and verbally request the browser extension via a microphone feed to find code requiring matching modifications in other browser tabs. The browser extension can identify edited lines of text based on attributes in a the webpage, such as a GITHUB HTML file, and further identify GITHUB code in each browser window also based on attributes in the GITHUB HTML of those respective windows, and transmit the edited lines as well as the identified code to the LLM with a configuration prompt instructing the LLM to identify lines in the identified code which contain instructions similar to the pre-edited edited lines, which would benefit from matching or including similar improvements as those provided in the post-edited edited lines.

In this example, the application context is that of a source code review process. The configuration prompt can be supplemented with device or session specific values related to the client device 140 or the computer application server 102. If the combined data object is transmitted to the computer application server 102, computer application server 102 can augment or supplement the configuration prompt before transmitting the combined data object to the language processing device. A portion of the configuration prompt can describe setting information, disclosing that the combined data object includes source code content, that the user query can be related to the source code content, and that the response should attempt to be relevant to both the source code content and the user query.

Figure 2:
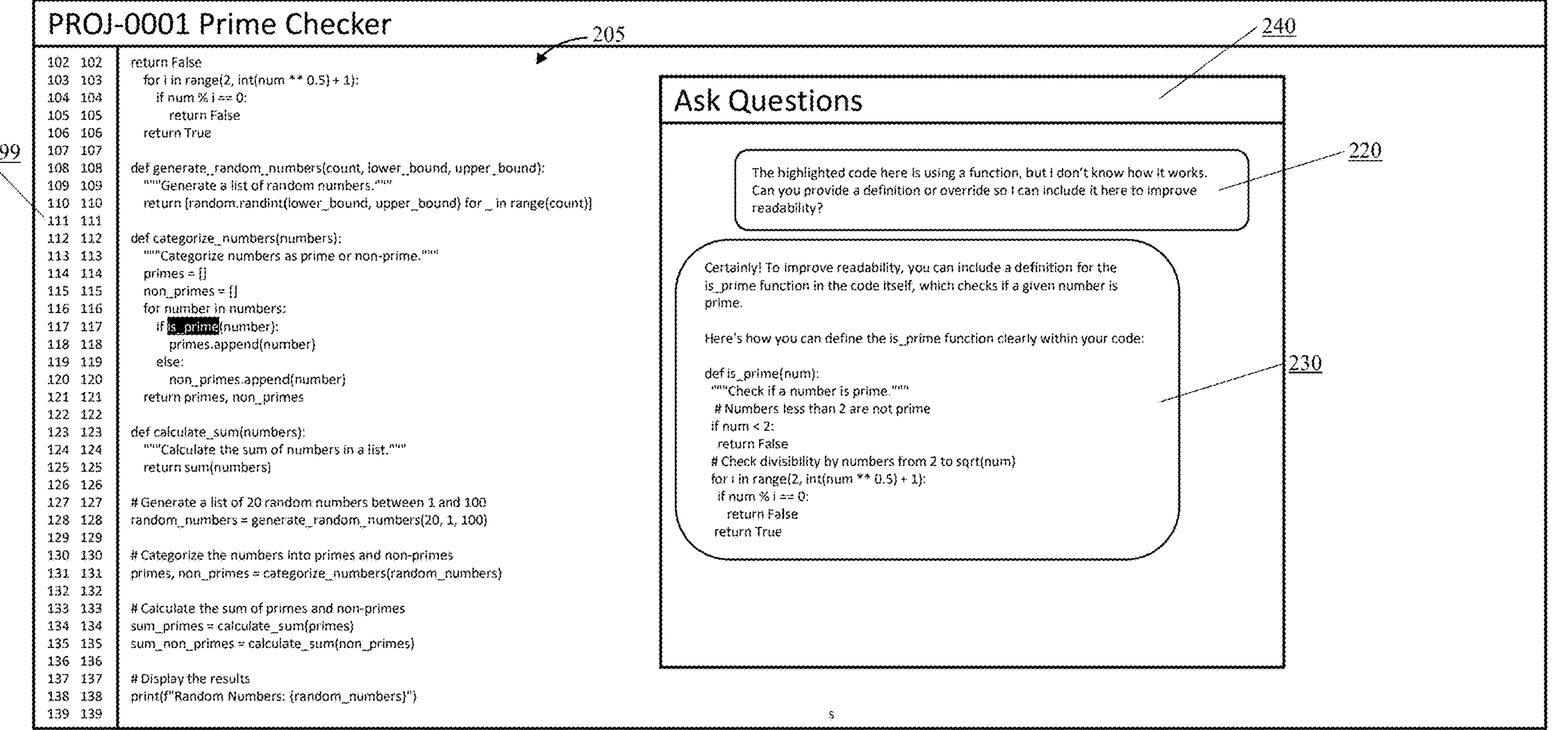
FIG. 2 illustrates an example screen of the context-sensitive development support system providing software code feedback based on user input and a contextual source code file.

FIG. 2 illustrates an example screen of the context-sensitive development support system providing software code feedback based on user input and a contextual source code file. In an example, the source code content is a source code file 205 displayed on the client device 140, which has been loaded in from a source code repository operating on the computer application server 102. The user has highlighted the "is_prime" function 211. The user query 220 is an interrogative requesting an explanation of the highlighted function in the source code content. The configuration prompt discloses that the source code content is source code, the user query 220 is being made at a client device 140 which is currently viewing the source code content 205, the highlighted text 211 recites "is_prime" and that any response 230 should endeavor to satisfy the user query 220 with the added prompt context of the provided source code content 205. The configuration prompt can also indicate that the response 230 should be segmented into two portions: a first portion, which includes the displayed text "Certainly! To improve readability . . . return True" and is intended to be displayed and read by the user as a conversational text message at the interface view of the browser extension window, and a second portion which includes the formatted text:

```
def is_prime(num):
    """Check if a number is prime."""
    # Numbers less than 2 are not prime
    if num < 2:
        return False
    # Check divisibility by numbers from 2 to sqrt(num)
    for i in range(2, int(num ** 0.5) + 1):
        if num % i == 0:
            return False
    return True
```

and is intended to be injected into the markup language of the web page as an insertion at code line one-hundred and eleven (299), thereby modifying the source code content (and a subsequent POST message from the browser to the GITHUB server when the user saves their revisions to the code file) in the browser at the client device 140, in order to include the function definition provided by the LLM.

In some embodiments, the language processing device 130 receives the combined data object as a prompt and produces a response 230. The language processing device 130 can implement a public or shared generative AI model, or the language processing device 130 can implement a private generative AI model. The generative AI model can be directed to resolving queries related to source code. The language processing device 130 can implement a retrieval-augmented generation (RAG) process, which can rely on information included in the combined data object or an authoritative knowledge base separate from the training data.

In some embodiments, the response 230 from the language processing device 130 can be directly transmitted to the client device 140 via the network 118, or the response 230 can be transmitted to the computer application server 102 before ultimately transmitting the response 230, a portion of the response 230, or a modified portion of the response 230 to the client device 140.

In some embodiments, when receiving the response 230, when the response 230 has a first portion and a second portion, the browser extension can split the response 230. The first portion of the response 230 can be displayed in the interface view 240 as a text message in the chat window 240. The second portion of the response 230 can be used to modify the text (e.g., at line one-hundred and eleven (299)) within the source code content 205. The browser extension can utilize the web forms present in the webpage as loaded to modify the text, or the browser extension can directly modify the text strings within the webpage markup to prepare a change in the text of the source code content. In an example, the client device 140 is displaying a source code web form 205. The web page includes a label identifying the "Project ID" of the source code content with the value "PROJ-0001". The user can type into the browser extension interface 240 "Can you mark my current project as ready for review?" and submit the query. The browser extension and the computer application server 102 can bundle together prompt context information to assist the LLM in determining what "my current project" refers to, as well as the web form markup data 205. The browser extension and the computer application server 102 submit the user prompt to the LLM, with an additional configuration prompt instructing that user queries which refer to "marking" a "project" should return a conversational text message as a first portion, and a markup tag modification including the requested data in the markup tag. In this example, the LLM can return as the second portion "<LC1>PROJ-0001 Prime Checker—Under Review</LC1>". The client device 140, using the returned second portion, can modify the source code content of the web page based on the chat window text message to add a first line of text to the source code, reciting "PROJ-0001 Prime Checker—Under Review", and further can transmit the modified source code to the computer application server 102. The computer application server 102, upon receiving the LLM response 230 or upon receiving the modified source code, can modify the related project management ticket related to PROJ-0001 to indicate the ticket should be marked as "Under Review."

In certain embodiments, the combined data object is transmitted to the computer application server 102 before being transmitted to the language processing device 130. The computer application server 102 can retrieve a desired functionality associated with the source code content. The computer application server 102 can include a mapping between the source code content and a project management ticket. The project management ticket can include a written description of a problem to be solved, or a feature or function to be implemented. The computer application server 102 can include this written description with the combined data object, and modify the configuration prompt to direct the Gen AI to further determine whether the source code content satisfies the written description, before transmitting the combined data object to the language processing device 130. In specific embodiments, the computer application server 102 can attach additional source code content to the combined data object. The additional source code content can be source code files referred to by the source code content, or by the written description. The additional source code content can also be stored in the authoritative knowledge base. The language processing device 130 can be instructed to review the additional source code when determining whether the written description is satisfied, or in responding to the user query. The language processing device 130 can also update project management applications, and project management tickets within the project management applications, based on the reviewed source code content.

For example, the source code content can contain new code which refers to legacy code in a legacy code file in a code repository. By including the legacy code with the new code in the combined data object, the language processing device 130 can determine whether the new code, in calling or referring to function in the legacy code, satisfies either any written description from a project management ticket, or a user query, combined in the combined data object.

In some embodiments, the computer application server 102 includes a coding guidelines repository, or the authoritative knowledge base includes a coding guidelines repository. The coding guidelines repository can be utilized by the language processing device 130 in responding to the user query regarding the source code content. For example, when the user query requests formatting improvements to the source code content, the language processing device 130 can either be provided formatting guidelines by the computer application server 102 or be provided access to formatting guidelines in the authoritative knowledge base. The language processing device 130, afforded access to formatting guidelines, is then capable of providing a response related to improving formatting of the source code content, based on the formatting guidelines.

3.2 Recorded Meeting Summarization

Figure 3:
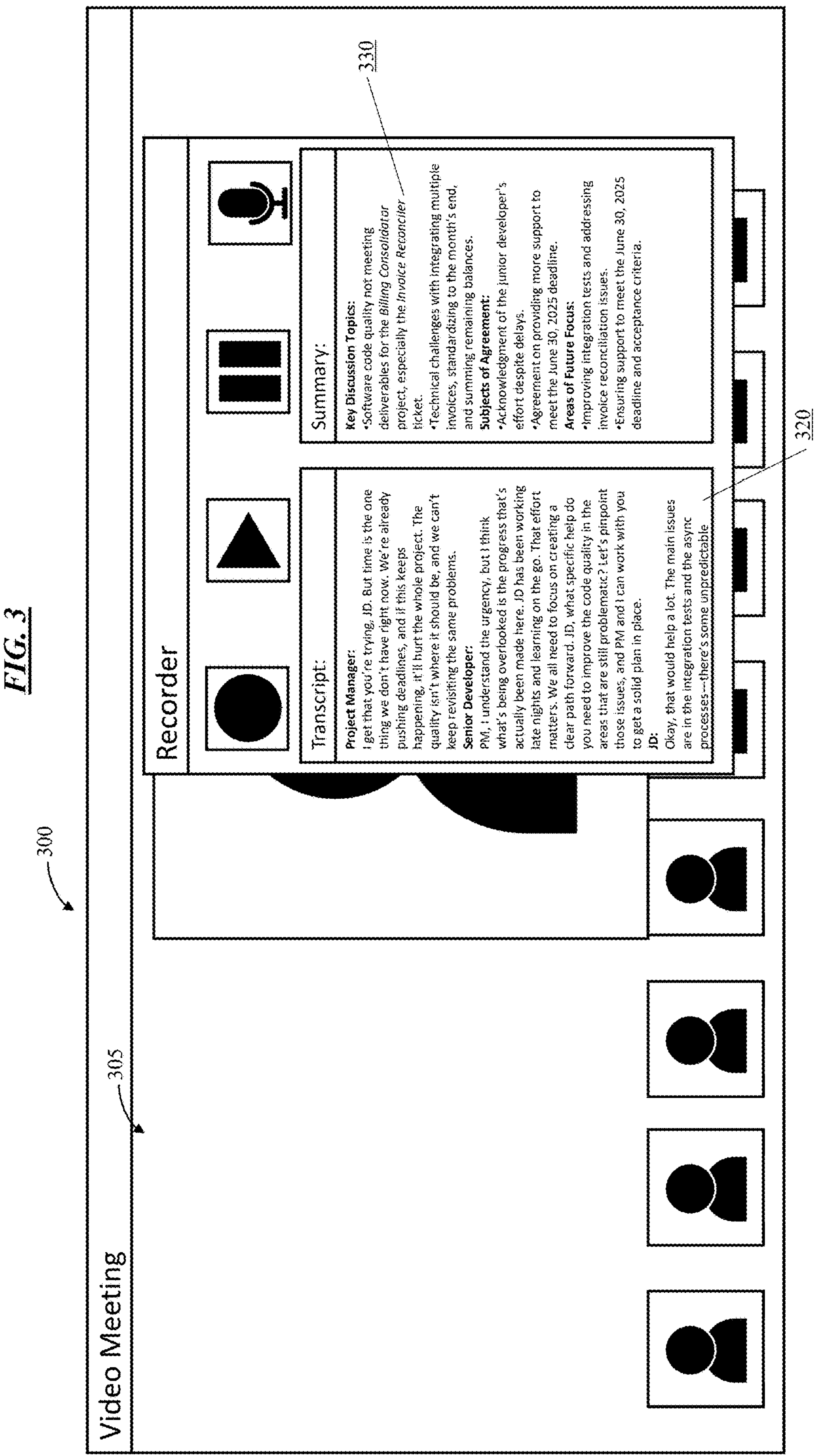
FIG. 3 illustrates an example screen of the context-sensitive development support system providing a meeting summary or an actionable ticketing record based on a contextual digital meeting input stream.

FIG. 3 illustrates an example screen of the context-sensitive development support system providing a meeting summary or an actionable ticketing record based on a contextual digital meeting input stream.

In an embodiment discussed herein, a browser 300 loads a webpage 305 joined to a web meeting containing one or more audio and video feeds.

The browser extension has access to the video and audio feeds as received by the browser 300. In some embodiments, the browser 300 has been granted access to any video and audio feeds being generated by virtual meeting software applications running within the browser. The browser extension, similarly based on attributes depicted in the configuration file, could recognize the application context. The browser extension can maintain separation between the video and audio feeds. In some embodiments, transmitting or processing only the audio feed improves efficiency. The browser extension transcribes, or submits for transcription, the audio feed to an external application, such as an application hosted on the computer application server 102. The computer application server can receive audio feeds from multiple client devices, producing multiple separate transcriptions. The separate transcriptions can be combined into a unified transcription 320. The separate transcriptions can be combined on the basis of time-stamped segments of transcribed text, ordered sequentially, or can be combined based upon semantic context of the transcribed text. In embodiment where transcriptions are combined based upon semantic context, the language processing device 130 can be used to determine the semantic context and produce the unified transcription.

In some embodiments, the corresponding video feeds can be similarly analyzed and utilized. As opposed to transcriptions of audios, additional facial expressions, body language, moods, or sentiments can be inferred, for example, from videos. The following discussions regarding audio feeds thus also apply to video feeds wherever applicable.

By maintaining separation in audio feeds, and consequently transcriptions, the web tool can be better able to delineate a user identity associated with the source of the respective audio feeds. For example, in some embodiments, the web tool can determine when the audio feed was generated at the client device 140, as compared to other audio feeds. The web tool can, in some embodiments, determine the user identity for each audio feed.

In some embodiments, the transcription 320, whether unified or separated, or tagged with user identities, can be submitted to the language processing device 130 as part of a combined data object in order to produce a summary 330 of the collective transcription 320. The combined data object can also include a configuration prompt, instructing the language processing device 130 to produce a summary of the collective transcription.

In some embodiments, the configuration prompt can describe a desired format of the summary 330. The format of the summary 330 can be structured for consumption by the computer application server 102 for the purpose of creating a project management ticket in a project management application. The computer application server 102 can receive the output of the language processing device 130 and create and store a project management ticket conforming to the summary produced by the language processing device 130.

In an example, a virtual meeting is occurring, as shown in FIG. 3. The meeting includes a brief greeting, a discussion of software code not meeting deliverables, and an acknowledgement of developer effort being put in. The parties to the meeting include a project manager who is irritated at the code quality, a junior developer defending their work, and a senior developer mediating the project manager and the junior developer. The transcript of the meeting, shown in FIG. 3, can be transmitted to the LLM along with contextual information. For example, the meeting can be associated with a meeting title in a scheduling application, such as "Invoice Reconciler Recap". The LLM can be provided this meeting title information, along with a software development ticket related to the "Invoice Reconciler" ticket. The ticket, which has been previously created and stored in a ticket management application or database, can include a deadline of Jun. 30, 2025, and acceptance criteria including "accept multiple invoices, standardize the invoices to the end of a given month, and sum their remaining balances per that end of the month date." The summary can then be prepared by the LLM to include this contextual information, which may have not been explicitly spoken during the virtual meeting, but was implied by the contextual information related to the meeting (i.e., the scheduling information and the associated ticket). Consequently, the meeting summary can include text such as "Agreement on providing more support to meet the Jun. 30, 2025 deadline." despite the deadline date not being mentioned explicitly in the virtual meeting.

Alternatively, the summary of the meeting can be formatted into a message structure to interact with an API of a project management software application, and could be structured to include:

```
Project_ID: "Billing Consolidator"
Ticket ID: "Invoice Reconciler"
Deadline: "2025 Jun. 30"
Acceptance Criteria: "accept multiple invoices, standardize the
invoices to the end of a given month, and sum their remaining
balances per that end of the month date"
```

The summary structure can be provided by an LLM prompt. For example, the LLM prompt could be configured to include the Deadline field by instructing the LLM to review the entire transcript, and determine a primary topic of conversation in the transcript; next, to determine a deadline date from the transcript associated with the primary topic of conversation; and to return the phrase "Deadline:" with the determined deadline date in a YYYY-MM-DD date format. The message can be sent to the project management software application via the API, and either update an existing ticket entitled "Invoice Reconciler" in the "Billing Consolidator" project, or create a new ticket entitled "Invoice Reconciler" in the "Billing Consolidator" project.

In some embodiments, the user identities can be combined with a database containing background information, including organizational roles, associated with the identified user identities. This background information can also be provided to the language processing device 130, in the form of appended data to the combined data object, or as data within the authoritative knowledge base. The prompt can be modified to provided summarization instructions based upon the background information of user identities associated with specific audio feeds. For example, the prompt can instruct the language processing device 130 to weigh suggestions made by a user identity associated with "Senior Manager" higher than those associated with a "Seasonal Intern". The prompt can instruct the language processing device 130 to weigh what it determines to be "acceptance criteria" provided by a user identity associated with "Product Manager" higher than acceptance criteria provided by a user identity associated with "Senior Software Developer". The prompt can instruct the language processing device 130 to weigh what it determines to be "affected software modules" provided by a user identity associated with "Senior Software Developer" higher than affected software modules provided by a user identity associated with "Product Manager". The prompt can instruct the language processing device 130 to weigh "project budget" suggestions extremely highly from a user identity associated with "Chief Financial Officer", irrespective of any other user identities. The language processing device 130 can then receive the meeting transcript 320, the weights of suggestions of particular parties in the transcribed meeting, and instructions on processing the meeting transcript 320 and weights to produce a new software development ticket that conforms to the contents of the meeting transcript, with elements of the ticket weighted based upon the speaker of particular contributions to a particular element and their user identity.

In some embodiments, the prompt instructs the language processing device 130 to identify which user identities contributed to which summarization elements. In some embodiments, the summary is messaged via a messaging service to meeting attendees, invitees, or interested party messaging accounts.

In some embodiments, the audio feeds are dynamically transcribed and sent to the language processing device 130, which then returns a summary 330 conforming to the prompt dynamically, as the meeting occurs. Further transcription data is then provided to the language processing device 130, along with the previous transcription data, in order to dynamically and in real-time produce revised summaries 330.

In some embodiments, the prompt can be configured to instruct the language processing device 130 to particularly identify and respond to specific language or commands. For example, a command that states "this meeting is now off the record" would indicate a section of the transcription 320 to not be included in the summary until the command "this meeting is now on the record" is read into the transcription 320. The prompt can instruct the language processing device 130 that a command reciting "Extension: the name of the ticket is 'Package Return Tracking'" is a firm instruction to specifically name a product management ticket created based on the transcription 320 or a section of the transcription 320 including or near the command, with the name "Package Return Tracking". The commands can be further modified by the weight of the user identity discussed above. In an example, the project manager user identity may be the only user identity which can have authority to set a ticket name: the weighing would then give the project manager user identity a maximum weight (e.g., 1.0) when providing instructions on the product management ticket name. This embodiment can be further expanded by provided an organizational chart to the language processing device 130 in determining user identity weighing: for example, the project manager can have maximum weight when setting a ticket name, and any user identity in the meeting to which the project manager user identity directly or indirectly reports to can also have a maximum weight. Alternatively, the weights can be dynamic: the project manager user identity can have a maximum weight when setting a ticket name, until some user identity to which the project manager user identity reports sets a ticket name: then only that user identity has maximum weight in setting the ticket name, until overridden by a user identity to which that user identity reports to. In an example, a project manager can set a ticket name by command, but once a director on the call sets the ticket name by command, it can only be changed by any other director or anyone above a director in the organizational chart.

In some embodiments, the transcriptions 320 can be parsed into several discrete sections of conversation, where one or more of the discrete sections are utilized to produce discrete summaries. For example, an audio feed which discusses three separate software development projects, can produce a single transcript which nonetheless can be divided into three separate project management tickets to be indexed in the computer application server 102.

In some embodiments, the client device 140 will request permission to record the audio or video feeds associated with a user account. In some embodiments, a digital meeting is not required, and an ad-hoc meeting of a single client device 140, such as a recording for a later presentation can be held. Alternatively, in some embodiments the web tool can record an audio or video feed within a webpage unrelated to meeting software.

3.3 Organization Dependency Graph Service

A process summary is a multifaceted summarization of key points of a business procedure or workflow implemented in networked software. The process summary includes a written description of the business procedure or workflow summarizing the organizational objective of the workflow implemented in software. The process summary can also include a recordation of the network traffic that occurs between a client device 140 and other devices on the network 118 when the client device 140 executes the networked software to accomplish the business procedure or workflow. The recordation of network traffic and other inter-application traffic can be transformed into a list or graph of networked nodes coupled to or within the network 118 which the client device 140 directly or indirectly sends or receives network traffic to or from.

In an embodiment discussed herein, the browser 400 of the client device 140 connects to a webpage. The browser 400 maintains a feed or log of network access calls made on behalf of data or interactions made with the webpage. The browser extension 405 can have access to the logs of other browser extensions and internal applications, recording various events including calls to other applications across networks. The browser extension 405 can also separately logs each of its own events, including interactions with a webpage or calls to another application running within the browser, on the host device, or on another device. The webpages generally correspond to entry points of a business-triggered workflow in that a webpage would be associated with a user task (with a business purpose), such as updating a user's account information, and operation of the webpage would be supported by a backend process. Therefore, the business-triggered workflow would start with a webpage, which is tied to a web application, which is then tied to one or more applications or devices. Determining a business-triggered workflow and how often it is executed helps diagnose a technical problem based on a business description. For example, an issue could be reported as not being able update a user's address. The business-triggered workflow and its usage information can be used to map that business description to the webpage for updating a user's account information and ultimately trace the backend process to determine which application or device involved in the process might have been the cause of the issue.

Figure 4A:
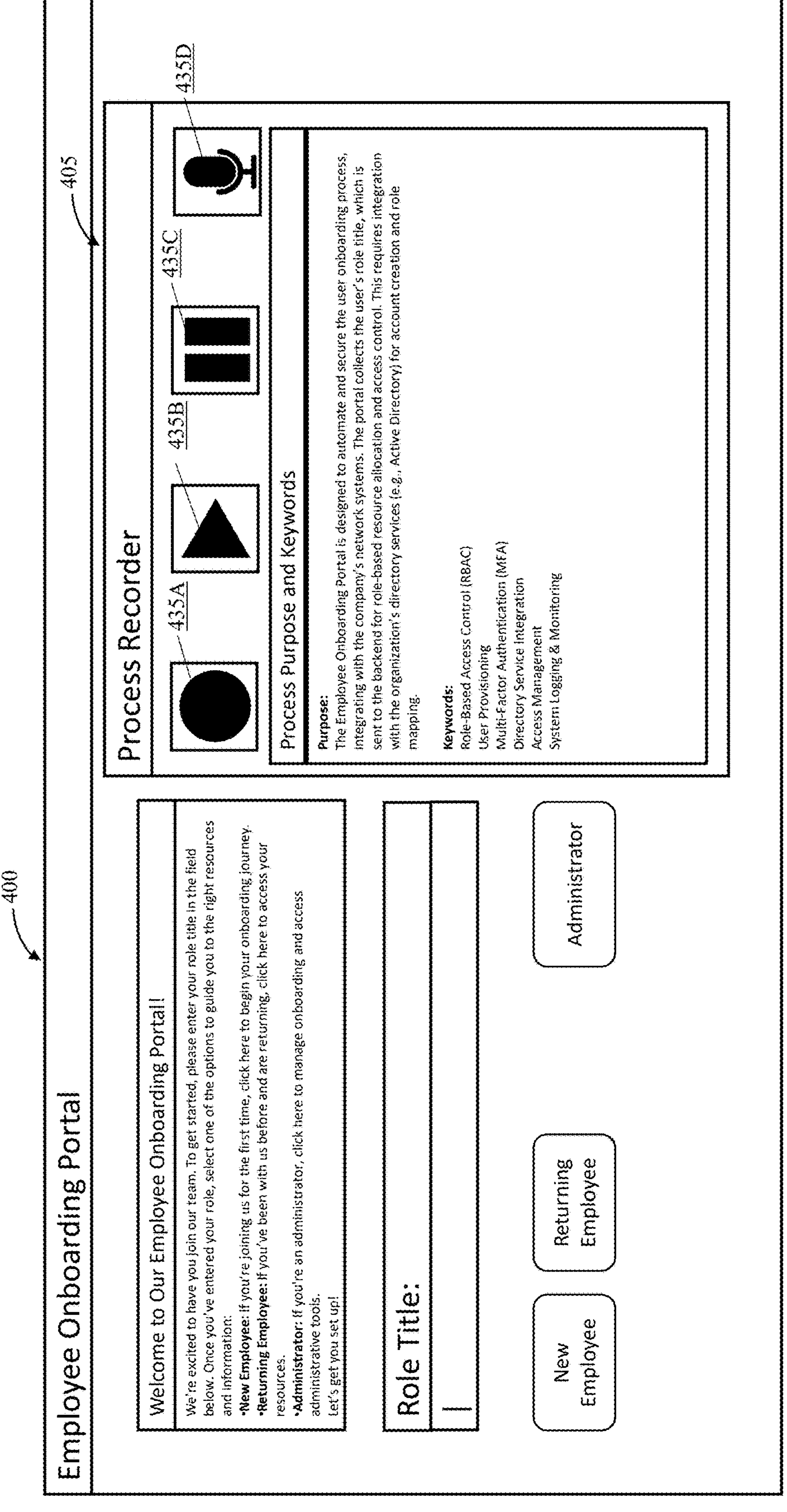
FIG. 4A illustrates an example screen of the context-sensitive development support system providing a process summary based upon user inputs and actions upon a software application.
Figure 4B:
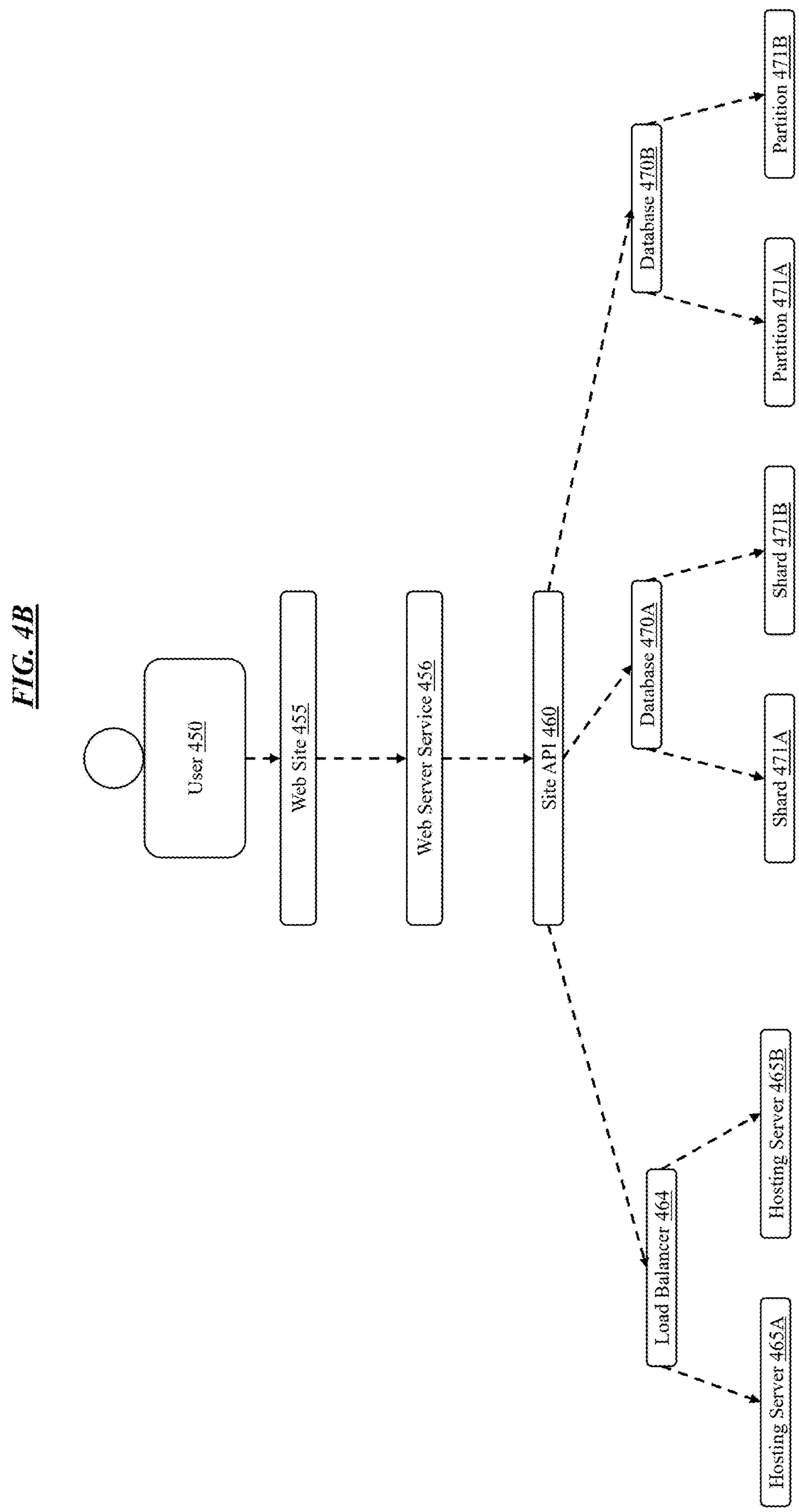
FIG. 4B illustrates an example graph of servers relevant to the process summary provided in FIG. 4A, indicating which resources impact the particular process executed by the software application.

FIG. 4A illustrates an example screen of the context-sensitive development support system providing a process summary based upon user inputs and actions upon a software application. FIG. 4B illustrates an example graph of servers relevant to the process summary provided in FIG. 4A, indicating which resources impact the particular process executed by the software application. FIG. 4C illustrates example prompts for an LLM to explore the example graph of 4B, based on certain user input queries.

In some embodiments, the browser extension 405 includes UI elements 435A-D to start and stop logging, in order to identify a beginning and end to the business-triggered workflow as executed in the software. In certain embodiments, the browser extension 405 detects and logs all browser events, subject to permissions and filtering settings, in order to use the logged browser events retrospectively to define business-triggered workflow usage, or additionally to update or make more robust existing business-triggered workflow usage graphs. For example, an initial graph may include a connection from a webpage to a web application W1 which calls a backend application running on Server A1, followed by network traffic through Servers A1, B1, and C1 in the graph as requisite traffic nodes in a particular business-triggered workflow. However, when the particular business-triggered workflow is subsequently traversed, the browser extension 405 can first detect that the particular business-triggered workflow is or has been re-traversed, and further can detect that Servers A1, B2, and C3 were the requisite traffic nodes communicated with on the subsequent traversal, as opposed to Servers A1, B1, and C1 as were initially traversed. Over time, the browser extension 405 can log and determine that servers A[1, 2, 3], B[1, 2], and C[1, 2, 3, 4] are all sets of servers which can be relied upon separately or in a particular sequence to complete the business-triggered workflow.

In some embodiments, the browser extension 405 combines logs with server records held at the computer application server 102. The computer application server 102 can include records of backend processes involved in the business-triggered workflow which intercommunicate over the network 118. However, these backend processes do not necessarily directly communicate with the client device 140, and as such the client device 140 has little or no visibility into the network traffic involved in these backend processes. Therefore, a computer application server 102 can track network traffic through the network 118, and observe and record messaging relationships between backend applications, or instantiate software similar to the browser extension, which would track the network traffic between the backend applications and the client device 140, as well as resultant traffic across the network 118 between backend applications required to facilitate the business-triggered workflow. In particular, the client device 140 records the network addressing information of sender and receiver network nodes in communication with the browser 400 on the client device 140, and particularly with those network nodes in communication with the browser 400 for the purpose of facilitating the activity on the active tab of the browser 400.

In some embodiments, the computer application server 102 maintains records of relationships between applications, servers, and networks on the basis of organizational or physical structure, rather than or in addition to the basis of observed network traffic. For example, the computer application server 102 can include records of which physical servers owned by an organization host which instances of certain applications. The physical servers can be clustered, and form a cloud structure, which the computer application server 102 can track and maintain as both a unitary asset and a contingency of discrete parts. The computer application server 102 can include records of organizational ownership, in terms of administrative ownership as well as organizational ownership. In an example, the computer application server 102 can record that a particular server is maintained by a West Coast Development Operations team, and can also record that the particular server is owned for usage purposes by the Distressed Financial Asset Team. Applications and instances of applications on the same or different physical machines can be administratively and organizationally owned by varying, or in some cases multiple parties. Ownership can also be structured hierarchically, where an asset owned by a low-level entity is owned by a higher-level entity with organizational control over the low-level entity.

The multidimensional ownership logging allows the client device 140 and the computer application server 102 to more robustly record the computing assets used in completing a particular business-triggered workflow. Continuing the example above, the business-triggered workflow which includes servers A[1, 2, 3], B[1, 2], and C[1, 2, 3, 4] can include those set of servers because all nine of those servers are owned by the employee onboarding team. The additional servers in each set represent several redundant physical servers which are available should demand overwhelm single servers in the set, or if certain servers in each set experience an outage. The employee onboarding team may have access permissions to operate certain applications on servers A[1, 2, 3], B[1, 2], and C[1, 2, 3, 4], and need to share those servers resources with other teams-consequently, as processing load on certain servers in the group increase, employee onboarding team traffic can be diverted to the lesser-trafficked servers in the groups.

Therefore, a graph produced based upon the recorded network traffic at the client device 140 and the internal traffic and organizational structures maintained at the computer application server 102 describes the entities, including servers, websites, web applications, non-web applications, networks, proxies, and other network entities which communicate over network 118, directly or indirectly with client device 140, for the purpose of facilitating a business-triggered workflow instantiated at the web application W running on the client device 140. The edges of the graph can represent network traffic, as well as ownership, inclusion, hosting, or dependencies between the entities described above which are accessed in furtherance of the summarized business-triggered workflow. The edge can have weights. For example, an edge that represents a "call" or "invocation" possibly across a network could have a weight based on a frequency of the call.

Once a version of the network graph is prepared, it can be provided to the language processing device 130 to facilitate user queries, where an LLM that has been trained to construct graph queries, for example. User queries which identify business-triggered workflows, applications, services, or network entities can be returned information which impact the queried item. For example, a query for networked entities owned by the Distressed Asset Team can return the servers that team owns, the Distressed Asset applications operating on those servers, business-triggered workflows which access the Distressed Asset applications; as well as the applications of other teams operating on the Distressed Asset servers, as well as the business-triggered workflows which utilize those services. Thus, a query to determine whether the Distressed Asset servers can be brought offline can be responded with information indicating which webpages associated with specific user tasks would be affected.

In some examples, in particular when the browser extension is not explicitly recording a specific business-triggered workflow, such a workflow can be inferred. Specifically, over a material number of interactions, across multiple client devices 140, the computer application server 102 and language processing device 130 can identify patterns in the network traffic of client devices 140, and ascertain that some implicit sequential business-triggered workflow is being executed. The language processing device 130 can summarize the ascertained business-triggered workflow, in particular when provided additional circumstantial evidence around the network traffic of the ascertained business-triggered workflow e.g., the names of webpages accessed in the business-triggered workflow, the type or title of organizational members executing the ascertained business-triggered workflow, etc.

For example, the user of the client device 140 can navigate to an internal payroll management web site. The browser extension 405 can receive typed input from the user stating, "This process is for onboarding a new employee". The interface element 435A that logs each network access call can be activated, and the browser extension 405 can begin logging network access calls. The user of the client device 140 can then navigate the internal payroll management website, entering new employee information, and ultimately onboarding that new employee. As the internal payroll management website is navigated, traffic occurs between the client device 140 and the user of the client device 140 can then interact with the interface element that completes the logging of network access calls. The browser extension 405 can then produce the list of network access calls as part of the list of applications and devices accessed as a result of accessing the website. The combination of the written description and the list constitutes a description of a business process (new employee onboarding) and a list of each networked element required or utilized in onboarding an employee.

Continuing the example, onboarding an employee can require determining whether the employee already exists at the organization: performing this determination can require a query of an internal employee database on an internal employee server. Onboarding can require validating a social security number: this validation can require accessing an external United States Social Security Business Services server. Onboarding can require provisioning a phone number to the employee: this can require accessing an internal telephony server, and again accessing the internal employee database on the internal employee server. In such an example, the combined data object could include "This process is for onboarding a new employee": [organization.employeeServer:4040, https://secure.ssa.gov/, organization.telephony:8080, organization.employeeServer:4040].

In some embodiments, the combined data object can be sent to the language processing device 130. The combined data object can also include an instructional prompt for processing the combined data object. The language processing device 130, which can have access to authoritative knowledge base, can be instructed to transform the written input to a standardized format.

In some embodiments, ultimately the combined data object is transmitted to the computer application server 102, where the combined data object is indexed and stored. The computer application server 102 can include additional identifying information: for example, a mapping between a server URL and a server IP address, a physical location of the server, an ownership group of the server, or an operating system and version operating on the server. The computer application server 102 can retrieve records from the authoritative knowledge base based upon the written description, the network access calls, mapped indexing data stored in the computer application server 102, or a combination thereof. Alternatively or additionally, the combined data object can be added to the authoritative knowledge base, in some embodiments after being transformed or standardized by the computer application server 102.

In some embodiments, the computer application server 102 or the authoritative knowledge base includes organizational records. Organizational records can include business entities which are responsible for or own various software application deployments or servers. Organizational records can include member records of those business entities. Organizational records can include records of which user accounts utilize which services.

In some embodiments, the user can enter user queries at the client device 140 regarding the organizational use of networked equipment and services. Such queries can be directed to whether a certain process or service utilizes or is impacted by a certain service or server being offline. Queries can be directed to whether certain processes can be performed presently, based on servers being offline.

Continuing the example above, the user can enter a query at the client device 140 which asks whether employee onboarding will be impacted by the Mergers and Acquisitions server being offline. In such an example, the user query will be combined with a prompt explaining the application context of the query, and directing the language processing device 130 to determine which logged process most closely matches the user query. Upon determining that the employee onboarding website most likely matches the description of "employee onboarding" in the user query, the language processing device 130 can generate a graph query involving a node representing the employee onboarding website for execution at the computer application server 102 against the graph database to receive to receive a list of nodes likely to be affected and the degree of impact. Upon receiving that response, the language processing device 130, based in part on the authoritative knowledge base, can determine whether node on the list represents the Mergers and Acquisitions server. Once one or more servers are identified, the results can be returned to the client device 140 for display. The language processing device 130 can be provided a prompt to generate one or more graph queries for finding a connected subgraph for the node representing the employee onboarding website, where the distance between each node in the connected subgraph from the node representing the employee onboarding website does not exceed a particular threshold.

In some embodiments, before returning one or more servers or services identified, all of the servers and services related to the process referenced in the query are returned, in order to illustrate the scope of any impact on the queried process. For example, some services can be replicated or sharded, and therefore one server hosting a portion of the service being offline cannot materially impact operation of that service.

FIG. 4B illustrates an example hierarchical response at the client device 140. The hierarchical response depicts the user 450, and a web site 455 which the user 450 accesses to perform their business-triggered workflow. The web site 455 traffic from the user 450 is received at a web server service 456, which is web server software such as an Apache Server instance, or an Internet Information Services instance. The web server service 456 is dependent upon a site API 460 used to access the functionality of the web site 455, including to make or process network calls and render webpages. The site API 460 communicates with a load balancer 464, which routes network traffic demanded by the Site API 460 to operate the web site 455 to one of two physical hosting servers 465A-B. The site API 460 also communicates with two distinct databases 470A-B for different datasets. The first database 470A is instantiated across two shards 471A-B, and the second database 470B is instantiated across two physical partitions 471A-B.

As an example, the original query from the client device 140 can state "will User 450 be impacted by hosting server 465B being offline?". The language processing device 130 can be instructed to generate an intermediate graph query for execution at the computer application server which returns processes which user 450 engages in. In this example, the graph query returns multiple workflow graphs, including a workflow graph describing network calls to load balancer 464, database 470A, and database 470B. The language processing device 130 can be instructed to then determine, using the authoritative knowledge base, whether any of the nodes in the workflow graph would correspond to "hosting server 465B". Upon identifying hosting server 465B among the multiple workflow graphs, the client device 140 is returned a tree map of the workflow graphs of business-triggered workflows which user 450 engages in, including all of the servers or services, which would potentially be impacted hosting server 465B being offline. The client device 140 can then display the relevant tree map or maps. In this example, because server 465B is behind a load balancer 464, so long as server 465A, which shares load with hosting server 465B is online, user 450 will not be impacted by hosting server 465B being offline.

FIG. 4C illustrates example prompts for an LLM to explore the example graph of 4B, based on certain user input queries. The first prompt fragment 498 is provided to the LLM when a user is attempting to obtain information related to the network map. When the user query is related to determining dependencies of a website, the first prompt fragment 498 instructs the LLM with an example format for a GraphQL (GQL) query, indicating how to prepare a MATCH clause, and subsequent WITH and CALL clauses in order to produce the expected result, formatted in a RETURN clause. The LLM is expected to modify this GQL query, and insert the name of the website or service for which the user is querying, ultimately returning a GQL query with the web site name filled in. The GQL query is then transmitted to the GQL database operating on a computer application server 102, which executes the GQL query. The response from the GQL database can then be returned to the LLM for formatting into a format expected by a graph renderer, in order to produce a graph similar in structure and format to the graph depicted in FIG. 4B.

The second prompt fragment 499 instructs the LLM on how to prepare a GQL query when the user query involves determining a list of servers which hose a particular web site or service. The LLM again returns the modified GQL query, which includes the proper identifier for the web site or server, and the GQL query is executed by the GQL database. The GQL database again produces a result, and the LLM can then reformat this result to either produce a graph, or a textual list of servers which host the queried web page or service.

4. Example Processes

Figure 5:
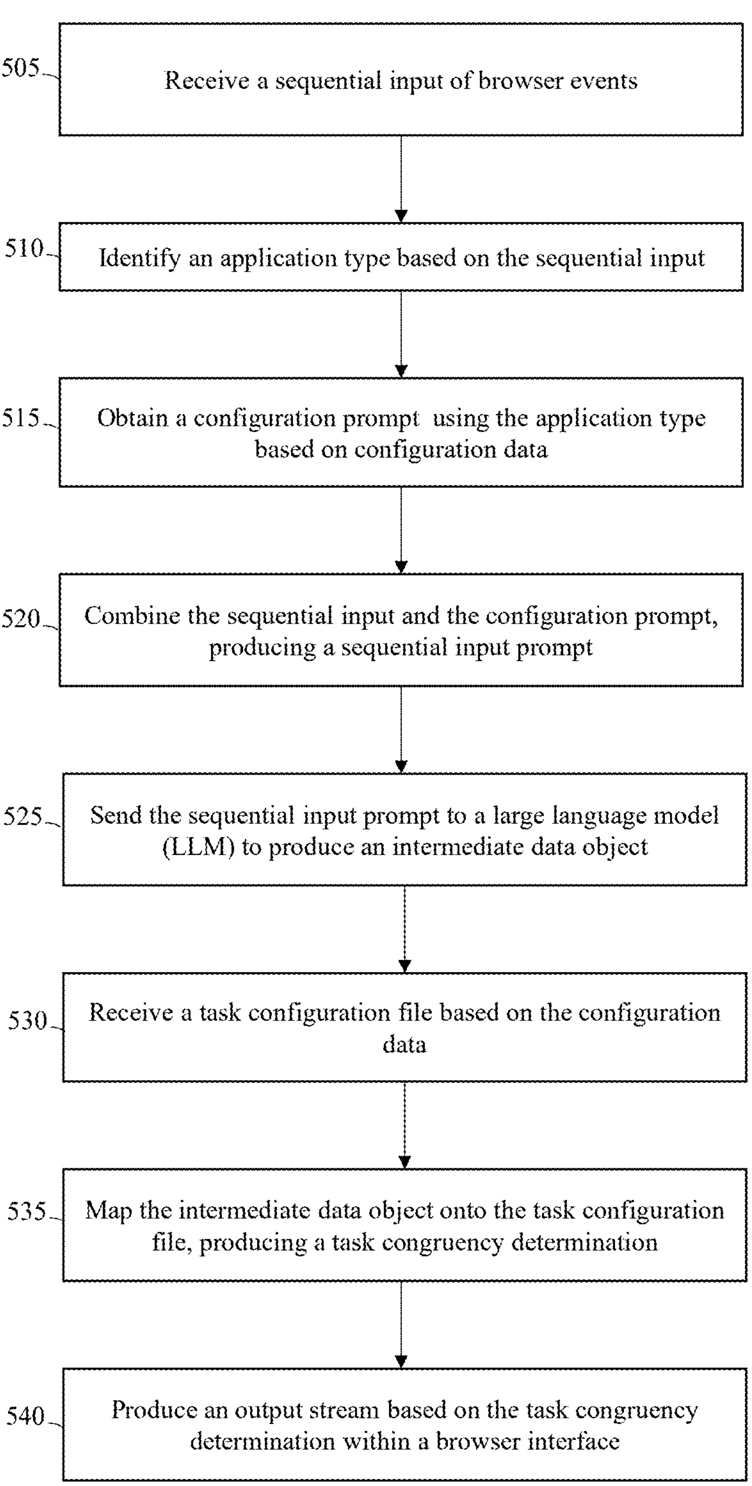
FIG. 5 illustrates an example process of performing context-sensitive application support for software development using artificial intelligence performed by a networked device in accordance with some embodiments described herein.

FIG. 5 illustrates an example process of performing context-sensitive application support for software development using artificial intelligence performed by a networked device in accordance with some embodiments described herein. FIG. 5 is shown in simplified, schematic format for purposes of illustrating a clear example and other embodiments can include more, fewer, or different elements connected in various manners. FIG. 5 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 505, the networked device is programmed to receive a sequential and real-time input of browser events, the browser events including front-end events and back-end events. In certain embodiments, the sequential input is a source code file associated with a pull request. In certain embodiments, the sequential input includes a list of network traffic events involving one or more network endpoints. In other embodiments, the sequential input includes a transcript of an audio feed of one or more participants in a virtual meeting. In still other embodiments, the sequential input includes a user query regarding a respective network node of or more network nodes.

In step 510, the networked device is programmed to identify an application type based on the sequential input.

In step 515, the networked device is programmed to obtain a configuration prompt using the application type based on configuration data. In some embodiments, the obtaining is further based on the user query. In certain embodiments, the configuration prompt includes a graph database schema, the graph database schema defining one or more database nodes corresponding to the one or more network nodes.

In some embodiments, the browser events include interface input from a user interface. In certain other embodiments, the networked device is further programmed to insert a backend node into the list of network endpoint sequences, the backend node bridging two or more or more network endpoints in the network map.

In step 520 the networked device is programmed to combine the sequential input and the configuration prompt, thereby producing a sequential input prompt. In certain embodiments, in step 520 the networked device is further programmed to combine the sequential input, configuration prompt, and the user query, thereby producing the sequential input prompt.

In step 525 the networked device is programmed to send the sequential input prompt to a large language model (LLM) to produce an intermediate data object. In certain embodiments, the intermediate data object includes a source code review result, indicating whether the source code file implemented desired functionality. In other embodiments, the intermediate data object includes a transcript summary result, summarizing the virtual meeting held by the one or more participants and including a project requirement. In still other embodiments, the intermediate data object includes a graph query, the graph query directed to querying information related to the respective network node. In particular embodiments, the intermediate data object includes a flow embedded vector, the flow embedded vector including one or more network nodes listed in the list of network traffic events.

In step 530 the networked device is programmed to receive a task configuration file based on the configuration data. In certain embodiments, the task configuration file includes a task description related to a ticket in a project management application based on the source code review result. In other embodiments, the task configuration file includes a summary creation prompt, describing a file format conforming to a task record data structure format. In still other embodiments, the task configuration file includes a graph database describing a network, the graph database including the one or more database nodes. In specific embodiments, the task configuration file includes a graph database schema, the graph database schema defining one or more database nodes corresponding to the one or more network nodes.

In step 535 the networked device is programmed to map the intermediate data object onto the task configuration file, thereby producing a task congruency determination. In other embodiments, the task congruency determination indicates whether the transcript summary result conforms to a task record data structure format. In still other embodiments, the task congruency determination includes the respective network node matched to a database node of the graph database. In a subset of those other embodiments, the task congruency determination includes a respective edge connected to a database node from the graph database schema, the database node matched to one of the one or more network nodes embedded in the flow embedded vector.

In step 540 the networked device is programmed to produce an output stream based on the task congruency determination within a browser interface. In certain embodiments, the output stream includes an instruction to update or add a ticket in the project management application. In some embodiments, the network device is programmed to further combine a plurality of coding guidelines to produce the intermediate data object, the intermediate data object including a proposed change to the source code file based on a comparison of the source code file to the plurality of coding guidelines. In other embodiments, the output stream includes a task record data structure including the project requirement. In still other embodiments, the output stream includes metadata retrieved from the graph database associated with the respective network node. In certain other embodiments, the output stream includes metadata associated with a respective edge. In a subset of those other embodiments, the output stream further includes a list of network nodes which share an edge with the respective node, each edge between two network nodes in the list of network nodes representing a respective network traffic event of a sequence of network traffic events.

In some embodiments, the network device is further programmed to receive feedback from an administrator device, and update a network endpoint sequence, the network endpoint sequence describing a plurality of node and edge relationships in the graph database, based on the feedback, producing a revised network endpoint sequence. In other embodiments, the network device is further programmed to add the network endpoint sequence to a list of network endpoint sequences, each network endpoint in each network endpoint sequence in the list of network endpoint sequences included in the network map.

5. Example Implementation

According to one embodiment, the techniques described herein are implemented by at least one computing device. The techniques can be implemented in whole or in part using a combination of at least one server computer and/or other computing devices that are coupled using a network, such as a packet data network. The computing devices can be hard-wired to perform the techniques, or can include digital electronic devices such as at least one application-specific integrated circuit (ASIC) or field programmable gate array (FPGA) that is persistently programmed to perform the techniques, or can include at least one general purpose hardware processor programmed to perform the techniques pursuant to program instructions in firmware, memory, other storage, or a combination. Such computing devices can also combine custom hard-wired logic, ASICs, or FPGAs with custom programming to accomplish the described techniques. The computing devices can be server computers, workstations, personal computers, portable computer systems, handheld devices, mobile computing devices, wearable devices, body mounted or implantable devices, smartphones, smart appliances, internetworking devices, autonomous or semi-autonomous devices such as automated machines or automated ground or aerial vehicles, any other electronic device that incorporates hard-wired and/or program logic to implement the described techniques, one or more virtual computing machines or instances in a data center, and/or a network of server computers and/or personal computers.

Figure 6:
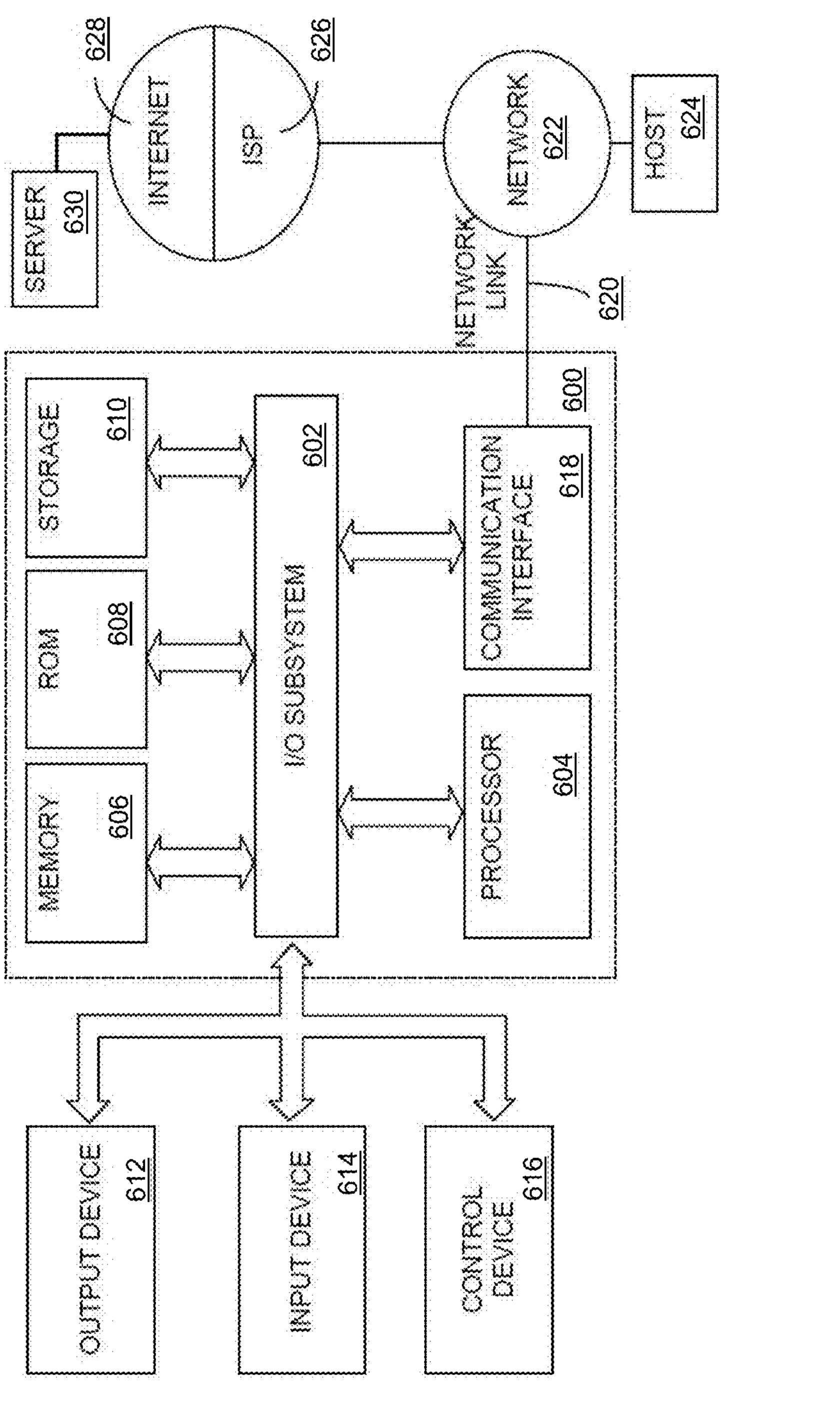
FIG. 6 illustrates a computer system upon which various embodiments may be implemented.

FIG. 6 is a block diagram that illustrates an example computer system with which an embodiment can be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 600 includes an input/output (I/O) subsystem 602 which can include a bus and/or other communication mechanism(s) for communicating information and/or instructions between the components of the computer system 600 over electronic signal paths. The I/O subsystem 602 can include an I/O controller, a memory controller and at least one I/O port. The electronic signal paths are represented schematically in the drawings, for example as lines, unidirectional arrows, or bidirectional arrows.

At least one hardware processor 604 is coupled to I/O subsystem 602 for processing information and instructions. Hardware processor 604 can include, for example, a general-purpose microprocessor or microcontroller and/or a special-purpose microprocessor such as an embedded system or a graphics processing unit (GPU) or a digital signal processor or Advanced Reduced Instruction Set Computer (RISC) Machine (ARM) processor. Processor 604 can comprise an integrated arithmetic logic unit (ALU) or can be coupled to a separate ALU.

Computer system 600 includes one or more units of memory 606, such as a main memory, which is coupled to I/O subsystem 602 for electronically digitally storing data and instructions to be executed by processor 604. Memory 606 can include volatile memory such as various forms of random-access memory (RAM) or other dynamic storage device. Memory 606 also can be used for storing temporary variables or other intermediate information during execution of instructions to be executed by processor 604. Such instructions, when stored in non-transitory computer-readable storage media accessible to processor 604, can render computer system 600 into a special-purpose machine that is customized to perform the operations specified in the instructions.

Computer system 600 further includes non-volatile memory such as read only memory (ROM) 608 or other static storage device coupled to I/O subsystem 602 for storing information and instructions for processor 604. The ROM 608 can include various forms of programmable ROM (PROM) such as erasable PROM (EPROM) or electrically erasable PROM (EEPROM). A unit of persistent storage 610 can include various forms of non-volatile RAM (NVRAM), such as FLASH memory, or solid-state storage, magnetic disk, or optical disk such as CD-ROM or DVD-ROM, and can be coupled to I/O subsystem 602 for storing information and instructions. Storage 610 is an example of a non-transitory computer-readable medium that can be used to store instructions and data which when executed by the processor 604 cause performing computer-implemented methods to execute the techniques herein.

The instructions in memory 606, ROM 608 or storage 610 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions can implement a web server, web application server or web client. The instructions can be organized as a presentation layer, application layer and data storage layer such as a relational database system using structured query language (SQL) or NoSQL, an object store, a graph database, a flat file system or other data storage.

Computer system 600 can be coupled via I/O subsystem 602 to at least one output device 612. In one embodiment, output device 612 is a digital computer display. Examples of a display that can be used in various embodiments include a touch screen display or a light-emitting diode (LED) display or a liquid crystal display (LCD) or an e-paper display. Computer system 600 can include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators, or servos.

At least one input device 614 is coupled to I/O subsystem 602 for communicating signals, data, command selections or gestures to processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which can perform cursor control or other automated control functions such as navigation in a graphical interface on a display screen, alternatively or in addition to input functions. Control device 616 can be a touchpad, a mouse, a trackball, or cursor direction keys for communicating direction information and command selections to processor 604 and for controlling cursor movement on the output device 612. The input device can have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 614 can include a combination of multiple different input devices, such as a video camera and a depth sensor.

In another embodiment, computer system 600 can comprise an internet of things (IoT) device in which one or more of the output device 612, input device 614, and control device 616 are omitted. Or, in such an embodiment, the input device 614 can comprise one or more cameras, motion detectors, thermometers, microphones, seismic detectors, other sensors or detectors, measurement devices or encoders and the output device 612 can comprise a special-purpose display such as a single-line LED or LCD display, one or more indicators, a display panel, a meter, a valve, a solenoid, an actuator or a servo.

When computer system 600 is a mobile computing device, input device 614 can comprise a global positioning system (GPS) receiver coupled to a GPS module that is capable of triangulating to a plurality of GPS satellites, determining and generating geo-location or position data such as latitude-longitude values for a geophysical location of the computer system 600. Output device 612 can include hardware, software, firmware, and interfaces for generating position reporting packets, notifications, pulse or heartbeat signals, or other recurring data transmissions that specify a position of the computer system 600, alone or in combination with other application-specific data, directed toward host computer 624 or server 630.

Computer system 600 can implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 600 in response to processor 604 executing at least one sequence of at least one instruction contained in main memory 606. Such instructions can be read into main memory 606 from another storage medium, such as storage 610. Execution of the sequences of instructions contained in main memory 606 causes processor 604 to perform the process steps described herein. In alternative embodiments, hard-wired circuitry can be used in place of or in combination with software instructions.

The term "storage media" as used herein refers to any non-transitory media that store data and/or instructions that cause a machine to operate in a specific fashion. Such storage media can comprise non-volatile media and/or volatile media. Non-volatile media includes, for example, optical or magnetic disks, such as storage 610. Volatile media includes dynamic memory, such as memory 606. Common forms of storage media include, for example, a hard disk, solid state drive, flash drive, magnetic data storage medium, any optical or physical data storage medium, memory chip, or the like.

Storage media is distinct from but can be used in conjunction with transmission media. Transmission media participates in transferring information between storage media. For example, transmission media includes coaxial cables, copper wire and fiber optics, including the wires that comprise a bus of I/O subsystem 602. Transmission media can also take the form of acoustic or light waves, such as those generated during radio-wave and infra-red data communications.

Various forms of media can be involved in carrying at least one sequence of at least one instruction to processor 604 for execution. For example, the instructions can initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 600 can receive the data on the communication link and convert the data to be read by computer system 600. For instance, a receiver such as a radio frequency antenna or an infrared detector can receive the data carried in a wireless or optical signal and appropriate circuitry can provide the data to I/O subsystem 602 such as place the data on a bus. I/O subsystem 602 carries the data to memory 606, from which processor 604 retrieves and executes the instructions. The instructions received by memory 606 can optionally be stored on storage 610 either before or after execution by processor 604.

Computer system 600 also includes a communication interface 618 coupled to I/O subsystem 602. Communication interface 618 provides a two-way data communication coupling to network link(s) 620 that are directly or indirectly connected to at least one communication network, such as a network 622 or a public or private cloud on the Internet. For example, communication interface 618 can be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 622 broadly represents a LAN, WAN, campus network, internetwork, or any combination thereof. Communication interface 618 can comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 618 sends and receives electrical, electromagnetic, or optical signals over signal paths that carry digital data streams representing various types of information.

Computer system 600 can also include a timer 632. The processor 604 can initiate the timer 632 to expire after an interval of time (e.g., 1 second, 1 minute, 10 minutes, etc.). In some embodiments, the processor 604 received an interrupt upon expiration of the timer 632. The processor 604 can, for instance, execute an interrupt service routine (ISR) in response to the interrupt. In some embodiments, the interrupt signals to the processor 604 that a task has failed to complete execution within a time interval that the timer 632 was initiated with.

Network link 620 typically provides electrical, electromagnetic, or optical data communication directly or through at least one network to other data devices, using, for example, satellite, cellular, Wi-Fi, or BLUETOOTH technology. For example, network link 620 can provide a connection through a network 622 to a host computer 624.

Furthermore, network link 620 can provide a connection through network 622 or to other computing devices via internetworking devices and/or computers that are operated by an Internet Service Provider (ISP) 626. ISP 626 provides data communication services through a world-wide packet data communication network represented as internet 628. A server 630 can be coupled to internet 628. Server 630 broadly represents any computer, data center, virtual machine, or virtual computing instance with or without a hypervisor, or computer executing a containerized program system such as DOCKER or KUBERNETES. Server 630 can represent an electronic digital service that is implemented using more than one computer or instance and that is accessed and used by transmitting web services requests, URL strings with parameters in HTTP payloads, application programming interface (API) calls, app services calls, or other service calls. Computer system 600 and server 630 can form elements of a distributed computing system that includes other computers, a processing cluster, server farm or other organization of computers that cooperate to perform tasks or execute applications or services. Server 630 can comprise one or more sets of instructions that are organized as modules, methods, objects, functions, routines, or calls. The instructions can be organized as one or more computer programs, operating system services, or application programs including mobile apps. The instructions can comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 630 can comprise a web application server that hosts a presentation layer, application layer and data storage layer such as a relational database system using structured query language (SQL) or NoSQL, an object store, a graph database, a flat file system or other data storage.

Computer system 600 can send messages and receive data and instructions, including program code, through the network(s), network link 620 and communication interface 618. In the Internet example, a server 630 might transmit a requested code for an application program through Internet 628, ISP 626, local network 622 and communication interface 618. The received code can be executed by processor 604 as it is received, and/or stored in storage 610, or other non-volatile storage for later execution.

The execution of instructions as described in this section can implement a process in the form of an instance of a computer program that is being executed, and consisting of program code and its current activity. Depending on the operating system (OS), a process can be made up of multiple threads of execution that execute instructions concurrently. In this context, a computer program is a passive collection of instructions, while a process can be the actual execution of those instructions. Several processes can be associated with the same program; for example, opening up several instances of the same program often means more than one process is being executed. Multitasking can be implemented to allow multiple processes to share processor 604. While each processor 604 or core of the processor executes a single task at a time, computer system 600 can be programmed to implement multitasking to allow each processor to switch between tasks that are being executed without having to wait for each task to finish. In an embodiment, switches can be performed when tasks perform input/output operations, when a task indicates that it can be switched, or on hardware interrupts. Time-sharing can be implemented to allow fast response for interactive user applications by rapidly performing context switches to provide the appearance of concurrent execution of multiple processes simultaneously. In an embodiment, for security and reliability, an operating system can prevent direct communication between independent processes, providing strictly mediated and controlled inter-process communication functionality.

6. Extensions and Alternatives

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed:

1. A method of performing context-sensitive application support for software development using artificial intelligence, comprising:

receiving a sequential input of browser events, including a user query input into the browser involving a first network endpoint;

identifying an application type based on the sequential input;

obtaining a configuration prompt using the application type based on configuration data specifying a graph in a graph database and a schema for the graph database, each node in the graph represents a network endpoint of a plurality of network endpoints, and each edge in the graph represents a relationship between two network endpoints;

combining the sequential input and the configuration prompt, producing a sequential input prompt;

sending the sequential input prompt to a large language model (LLM) to produce an intermediate data object as a flow embedding vector representing a subgraph connected to a node corresponding to the first network endpoint;

receiving a task configuration file describing a file format conforming to a task record data structure format based on the configuration data;

mapping the intermediate data object onto the task configuration file, producing a task congruency determination indicating how a second network endpoint is affected by the first network endpoint; and producing an output stream based on the task congruency determination within a browser interface, wherein the method is performed by one or more processors.

2. The method of claim 1, wherein:

the intermediate data object includes a graph query, the graph query directed to querying information related to a first node in the graph corresponding to the first network endpoint, the output stream includes metadata associated with the first node.

3. The method of claim 2, wherein:

the output stream further includes a list of nodes which share an edge with the first node, each edge between two nodes in the list of nodes representing a respective network traffic event of a sequence of network traffic events.

4. The method of claim 2, further comprising:

receiving feedback from an administrator device; and updating a network endpoint sequence, the network endpoint sequence describing a plurality of node and edge relationships in the graph database, based on the feedback, producing a revised network endpoint sequence.

5. The method of claim 2, wherein:

the sequential input including a list of network traffic events involving one or more network endpoints, and the method further comprising updating the graph database based on the list of network traffic events.

6. The method of claim 5, further comprising:

inserting a certain node into the graph, the certain node representing a backend network endpoint not directly connected with the browser.

7. The method of claim 1, further comprising:

receiving browser events related to one or more web applications;

accessing log data of one or more native applications;

building the graph based on the browser events and the log data, each node in the graph representing a website, webpage, web application, native application, or device, each edge in the graph representing a relationship between two nodes, each node and each edge having a weight indicating a frequency.

8. A non-transitory, computer-readable storage medium storing one or more sequences of instructions which when executed cause one or more processor to perform:

receiving a sequential input of browser events, including a user query input into a browser involving a first network endpoint;

obtaining a configuration prompt based on configuration data specifying a graph in a graph database and a schema for the graph database, each node in the graph represents a network endpoint of a plurality of network endpoints, and each edge in the graph represents a relationship between two network endpoints;

combining the sequential input and the configuration prompt, producing a sequential input prompt;

sending the sequential input prompt to a large language model (LLM) to produce an intermediate data object as a flow embedding vector representing a subgraph connected to a node corresponding to the first network endpoint;

receiving a task configuration file describing a file format conforming to a task record data structure format based on the configuration data;

mapping the intermediate data object onto the task configuration file, producing a task congruency determination indicating how a second network endpoint is affected by the first network endpoint; and producing an output stream based on the task congruency determination within a browser interface.

9. The non-transitory, computer-readable storage medium of claim 8, the one or more sequences of instructions when executed causing the one or more processor to further perform:

the user query including a description of the first network endpoint; and wherein mapping the intermediate data object onto the task configuration file includes:

combining the intermediate data object and the user query, sending the combined intermediate data object and the user query to the LLM to produce a second intermediate data object based on the intermediate data object, and mapping the second intermediate data object onto the task configuration file, producing the task congruency determination.

10. The non-transitory, computer-readable storage medium of claim 8, the one or more sequences of instructions when executed causing the one or more processor to further perform:

the user query including a description of a relationship with the first network endpoint; and wherein mapping the intermediate data object onto the task configuration file includes:

combining the intermediate data object and the user query, sending the combined intermediate data object and the user query to the LLM to produce a second intermediate data object based on the intermediate data object, and mapping the second intermediate data object onto the task configuration file, producing the task congruency determination.

11. A computer system for performing context-sensitive application support for software development using artificial intelligence, comprising:

a memory;

one or more processors coupled to the memory and configured to perform:

receiving a sequential input of browser events, including a user query input into a browser involving a first network endpoint;

obtaining a configuration prompt based on configuration data specifying a graph in a graph database and a schema for the graph database, each node in the graph represents a network endpoint of a plurality of network endpoints, and each edge in the graph represents a relationship between two network endpoints;

combining the sequential input and the configuration prompt, producing a sequential input prompt;

sending the sequential input prompt to a large language model (LLM) to produce an intermediate data object as a flow embedding vector representing a subgraph connected to a node corresponding to the first network endpoint;

receiving a task configuration file describing a file format conforming to a task record data structure format based on the configuration data;

mapping the intermediate data object onto the task configuration file, producing a task congruency determination indicating how a second network endpoint is affected by the first network endpoint; and producing an output stream based on the task congruency determination within a browser interface.

12. The non-transitory, computer-readable storage medium of claim 8, wherein the sequential input and the configuration prompt are further combined with the user query, producing the sequential input prompt.

* * * * *